(12) United States Patent
Maiorino et al.

(10) Patent No.: US 8,862,508 B2
(45) Date of Patent: Oct. 14, 2014

(54) SYSTEM AND METHOD FOR UNIFYING E-BANKING TOUCH POINTS AND PROVIDING PERSONALIZED FINANCIAL SERVICES

(76) Inventors: Thomas Maiorino, Mt. Laurel, NJ (US); Daniel Taylor, Downingtown, PA (US)

( * ) Notice: Subject to any disclaimer, the term of this patent is extended or adjusted under 35 U.S.C. 154(b) by 627 days.

(21) Appl. No.: 11/559,894

(22) Filed: Nov. 14, 2006

(65) Prior Publication Data

US 2007/0265948 A1    Nov. 15, 2007

Related U.S. Application Data

(60) Provisional application No. 60/736,248, filed on Nov. 14, 2005.

(51) Int. Cl.
*G06Q 40/00*    (2012.01)

(52) U.S. Cl.
USPC .......................................................... 705/35

(58) Field of Classification Search
USPC ................... 705/35–45, 14.1–14.36
See application file for complete search history.

(56) References Cited

U.S. PATENT DOCUMENTS

| | | | | |
|---|---|---|---|---|
| 6,223,983 | B1 * | 5/2001 | Kjonaas et al. | 235/379 |
| 6,334,110 | B1 * | 12/2001 | Walter et al. | 705/14 |
| 7,039,600 | B1 * | 5/2006 | Meek et al. | 705/14.36 |
| 7,246,082 | B1 * | 7/2007 | Meek et al. | 705/14.73 |
| 7,295,993 | B1 * | 11/2007 | Meek et al. | 705/16 |
| 7,379,893 | B1 * | 5/2008 | Meek et al. | 705/16 |
| 7,379,894 | B1 * | 5/2008 | Meek et al. | 705/16 |
| 7,379,895 | B1 * | 5/2008 | Meek et al. | 705/16 |
| 7,379,896 | B1 * | 5/2008 | Meek et al. | 705/16 |
| 7,516,087 | B1 * | 4/2009 | Meek et al. | 705/16 |
| 7,606,767 | B1 * | 10/2009 | Couper et al. | 705/43 |
| 7,716,096 | B2 * | 5/2010 | Drummond et al. | 705/35 |
| 8,121,914 | B1 * | 2/2012 | Drummond et al. | 705/35 |
| 2002/0111157 | A1 * | 8/2002 | Stieber et al. | 455/418 |
| 2002/0138432 | A1 * | 9/2002 | Makino et al. | 705/43 |
| 2003/0040959 | A1 * | 2/2003 | Fei et al. | 705/14 |
| 2003/0065563 | A1 * | 4/2003 | Elliott et al. | 705/14 |
| 2003/0120597 | A1 * | 6/2003 | Drummond et al. | 705/43 |
| 2003/0126084 | A1 * | 7/2003 | Drummond et al. | 705/43 |
| 2004/0010597 | A1 * | 1/2004 | Kirschner et al. | 709/228 |
| 2006/0036501 | A1 * | 2/2006 | Shahbazi et al. | 705/16 |
| 2006/0218061 | A1 * | 9/2006 | Mouline | 705/35 |

FOREIGN PATENT DOCUMENTS

WO    WO 2005078596 A1 *    8/2005    ............ G06F 15/00

OTHER PUBLICATIONS

Darling, Greg, "MCIFs get smarter", Credit Union Executive Journal; May/Jun. 2000; v 40, No. 3, pp. 1-5.*
Jooss, Ron, "Old dog, new tricks", Credit Union Management, vol. 21, No. 8, (Aug. 1998), pp. 24-27.*
Beirne,Michael, "Using an ATM to hit a bull's eye", Financial Services Online (Jan./Feb. 1998), pp. 1-4.*

* cited by examiner

*Primary Examiner* — Mohammad Z Shaikh
(74) *Attorney, Agent, or Firm* — Ference & Associates LLC; John W. Goldschmidt, Jr.

(57) ABSTRACT

A system and method for delivering a retail banking multi-channel solution that unifies interactive electronic banking touch points to provide personalized financial services to customers and a common point of control for financial institutions is provided.

20 Claims, 6 Drawing Sheets

SYSTEM AND METHOD FOR UNIFYING E-BANKING TOUCH POINTS AND PROVIDING PERSONALIZED FINANCIAL SERVICES

CROSS-REFERENCE TO RELATED APPLICATIONS

This application claims the benefit of U.S. Provisional Patent Application No. 60/736,248, filed Nov. 14, 2005, which is hereby incorporated by reference in its entirety.

BACKGROUND OF THE INVENTION

1. Field of the Invention

The present invention relates generally to the field of electronic banking solutions. More particularly, the present invention is directed to a system and method for delivering a retail banking multi-channel solution that unifies interactive electronic banking touch points to provide personalized financial services to customers and a common point of control for financial institutions.

2. Description of the Related Art

More than two-thirds of all transactions processed by financial institutions today no longer require customers to interact with a teller. Rather, a majority of customers are now conducting business with the electronic delivery systems provided by these financial institutions. Typical self-serving electronic delivery systems available through financial institutions today include automatic teller or transaction machines (ATM), self-service coin counters (SSCC), kiosks and various other online banking services provided via web-enabled interfaces.

These electronic delivery systems are well known in the art. ATMs, for example, are the most readably available and frequently used electronic delivery systems available in financial institutions today, enabling customers to easily and quickly carry out basic everyday financial transactions. Financial transactions that are commonly conducted through ATMs include the dispensing of cash in response to customer withdrawal requests, account balance inquiries, transfer of monetary funds between accounts or the acceptance of deposits into an open account. Yet, ATMs have evolved over time and are now configurable to provide more than simple financial services. Additional services that are becoming popular and more frequently provided through ATMs include, for example, the printing and/or dispensing of coupons, event tickets, vouchers, checks, food stamps and various other types of transactions typically provided in a teller-customer environment.

However, these conventional e-banking touch points continue to exist today as stand-alone systems, providing customers and financial institutions alike with relatively few control and presentation options. These stand-alone systems are deficient in that they limit the ability of financial institutions to provide a more personalized e-banking experience to customers, while at the same time providing a more unified means for regulating their systems through a common set of control consoles, without incurring the substantial costs associated with the upgrading of such legacy systems. In light of the many advantages that may be achieved by implementing a means for unifying all of a financial institution's e-banking touch points into a common point of control, there is currently no system or method in place for doing so.

Accordingly, it is desirable to provide an innovative system and method utilizing an added-value platform for unifying e-banking touch points and enabling a personalized customer experience.

SUMMARY OF THE INVENTION

It is an object of the present invention to provide a client-server platform configured to unify a plurality of e-banking touch points, thereby enabling financial institutions to deliver and maximize on the impact of electronic offerings, meet the challenges of increased competition between institutions providing similar services and enable a consistent, reliable and high quality transactional environment In light of the foregoing, these and other objects are accomplished in accordance with the principles of the present invention, wherein the novelty of the present invention will become apparent from the following detailed description and appended claims, and wherein a system and method for integrating a plurality of e-banking touch point delivery channels into a common client-server environment is provided.

The client-server environment employed in the present invention integrates with existing channel systems provided by financial institutions, associating and connecting them to a common multi-channel server. The multi-channel server is configured to unify transactional and customer related data processed throughout all e-banking touch point services provided by a financial institution. The data collected from the unified e-banking touch points may be managed through remote systems linked to the multi-channel server to execute a plurality of marketing and system control commands, administrable by personnel of the financial institution. Similarly, data collected from e-banking touch points is accessible through the multi-channel server to provide a means for examining specific customer habits in order to regulate what is viewed by customers revisiting the same or any other e-banking touch point of the financial institution.

The multi-channel server unifying e-banking touch points allows for robust distribution of advertisements and messages to any combination or group of transaction screens viewable by a customer, thereby providing customers with an opportunity to engage in various offers and/or promotions being provided by the financial institution. Customers are further enabled to customize their experience at any of the e-banking touch points via selection of personalized customer options accessible through web-enabled computers or devices communicating with the multi-channel server unifying the e-banking touch points of the present invention.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE PREFERRED EMBODIMENTS

The present invention is directed towards a system and method for unifying e-banking touch points residing at a plurality of financial institutions that can be remotely controlled from one common set of browser based consoles. For purposes of clarity, and not by way of limitation, illustrative views of the methods employed by the system of the present invention are described with references made to the above-identified figures. Various modifications obvious to one skilled in the art are deemed to be within the spirit and scope of the present invention.

Figure 1:
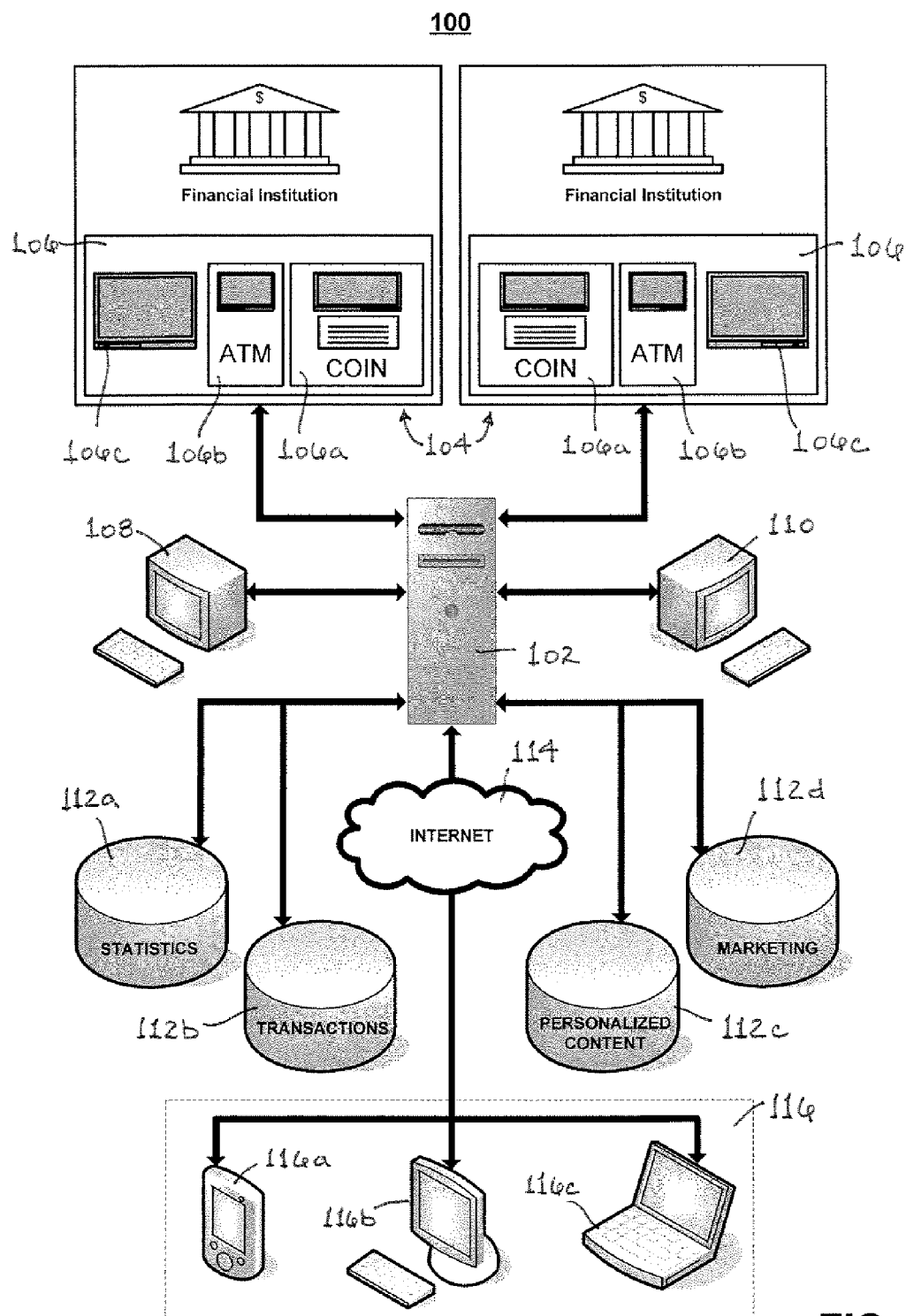
FIG. 1 is a schematic diagram of a banking platform system networked with a modular multi-channel server in accordance with an exemplary embodiment of the present invention.

An exemplary system 100 for implementing the present invention is illustrated in FIG. 1. It should be noted that this exemplary system is provided to demonstrate the novel aspects of the present invention, not for purposes of limitation and may encompass alternative networking components, devices and or systems. In accordance with a preferred embodiment of the present invention, system 100 is comprised of a multi-channel server 102 networked to a plurality of branch locations 104 associated with a financial institution, wherein each branch location employs the use of various e-banking touch points 106. E-banking touch points 106 may include an automatic teller/transaction machine (ATM) touch point 106b, a self-service coin counter (SSCC) touch point 106a, a plasma signage display (PSD) touch point 106c, alternate e-banking system touch points (e.g., a kiosk) or any combination thereof. It should be further noted that although multi-channel server 102 is illustrated as a single computing unit in FIG. 1, additional multi-channel servers may be collectively networked into system 100 of the present invention.

Multi-channel server 102 is additionally coupled to a marketing computer system 108 and an operations computer system 110 via the network of the present invention. Marketing computer system 108 may provide a financial institution's marketing personnel with the ability to remotely publish to a plurality of touch points interconnected via the network through multi-channel server 102. For example, marketing personnel may access a console on computer system 108 configured to permit distribution of various ads, promotions or messages to the transaction screens of any select number of remote touch points connected to multi-channel server 102. Similarly, operations computer system 110 may provide a financial institution's information technology (IT) personnel with the ability to administer a plurality of touch points located remotely at various branches. For example, IT personnel may access a console on computer system 110 configured to permit monitoring of performance, downloading of electronic journals, distribution of software upgrades, or any other applicable operational functions associated with the facilitation of a financial institution's remote touch points, thereby ultimately increasing the reliability of those touch points.

Various information transmitted and received by multi-channel server 102 may be regulated and stored in a systematic way through a collection of records and related data files provided in corresponding databases 112. Databases 112 may include, for example, a customer statistics database 112a, a customer transactions database 112b, a personalized customer content database 112c and a marketing database 112d. The aforementioned exemplary databases are provided merely for purposes of illustration, and not by way of limitation. System 100 of the present invention may employ any number of databases to support the processes and functions of multi-channel server 102.

Customers of the financial institution may interact with multi-channel server 102 via an Internet network 114 utilizing web-enabled customer devices 116. Web-enabled customer devices 116 may include a personal digital assistant (PDA) device 116a, a personal computer (PC) 116b, a wireless laptop 116c or any other suitable web-enabled device or system. For example, mobile web-enabled devices 116a and 116c may be equipped with a wireless application protocol (WAP) in order to receive bank related transaction notifications, as well as to enable an account holder to request and execute other financially related transactions. Mobile web-enabled devices 116a and 116c may be additionally equipped with wireless transmission components that are compatible with Wi-Fi standard IEEE 802.11, BLUETOOTH™ enabled, a combination of local area network (LAN), wide area network (WAN), wireless area network (WLAN), personal area network (PAN) standards or any other suitable means to permit secure wireless communication with multi-channel server 102.

Multi-channel server 102 may reside in an IT center of any particular banking branch for unifying the aforementioned components and providing a single operational platform for robustly monitoring, managing and controlling all related activity from a single remote location. The various touch points, computer systems and devices that may be coupled via the network to multi-channel server 102, as described above, pulls e-banking touch points into an extended client-server framework, thereby allowing financial institutions to robustly address their multiple touch point channels simultaneously in an easily-manageable collective real-time environment. Through the use of various browser-based consoles provided on marketing computer system 108, operations computer system 110 and web-enabled customer devices 116, a plurality of transactional and advertising related functions may be performed seamlessly. Some of these exemplary functions will be better understood in the following descriptions, taken in conjunction with the illustrations provided in FIGS. 2-5.

Figure 2A:
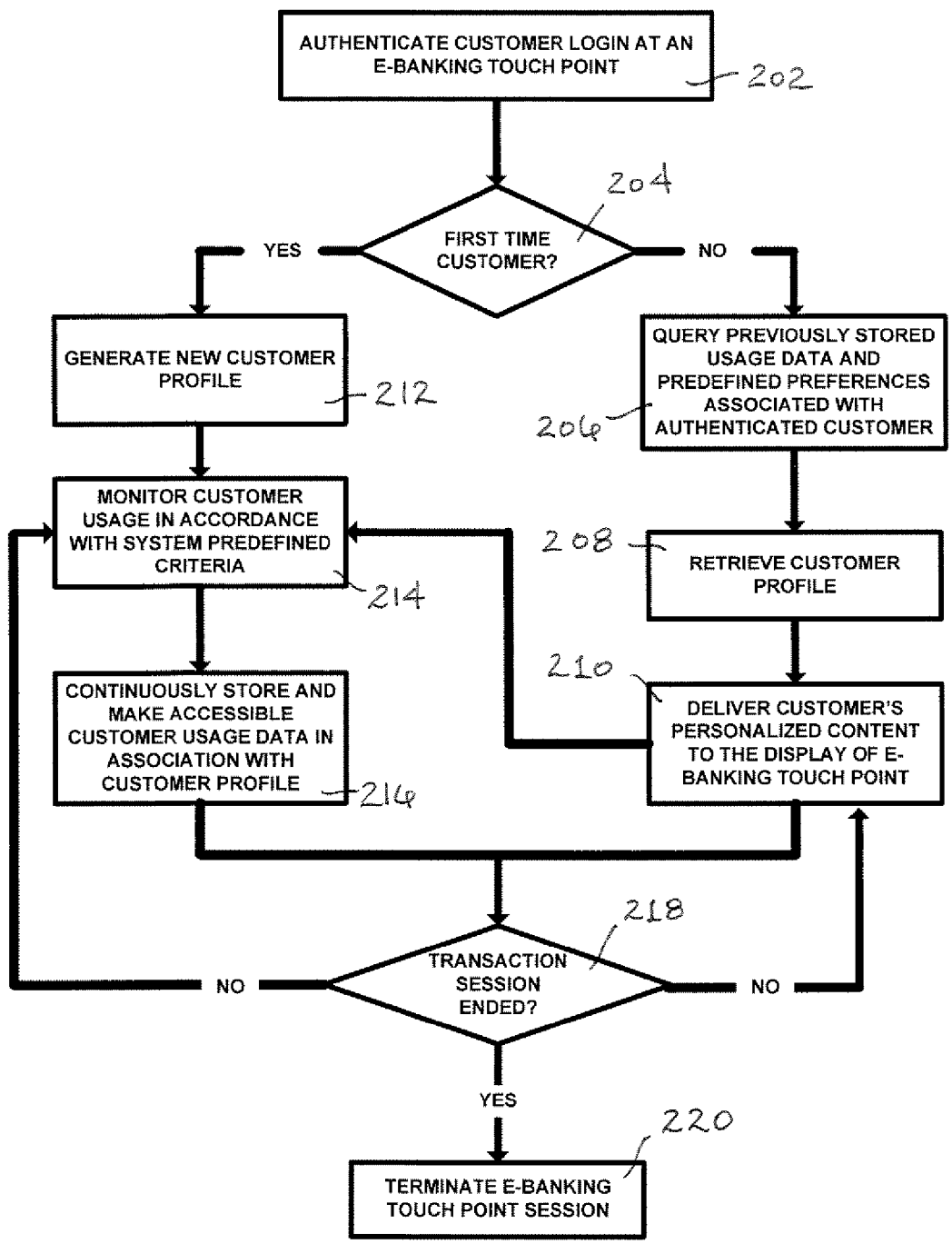
FIGS. 2A-2B are flowcharts illustrating the steps employed in personalizing touch point environments in accordance with an exemplary embodiment of the present invention.
Figure 2B:
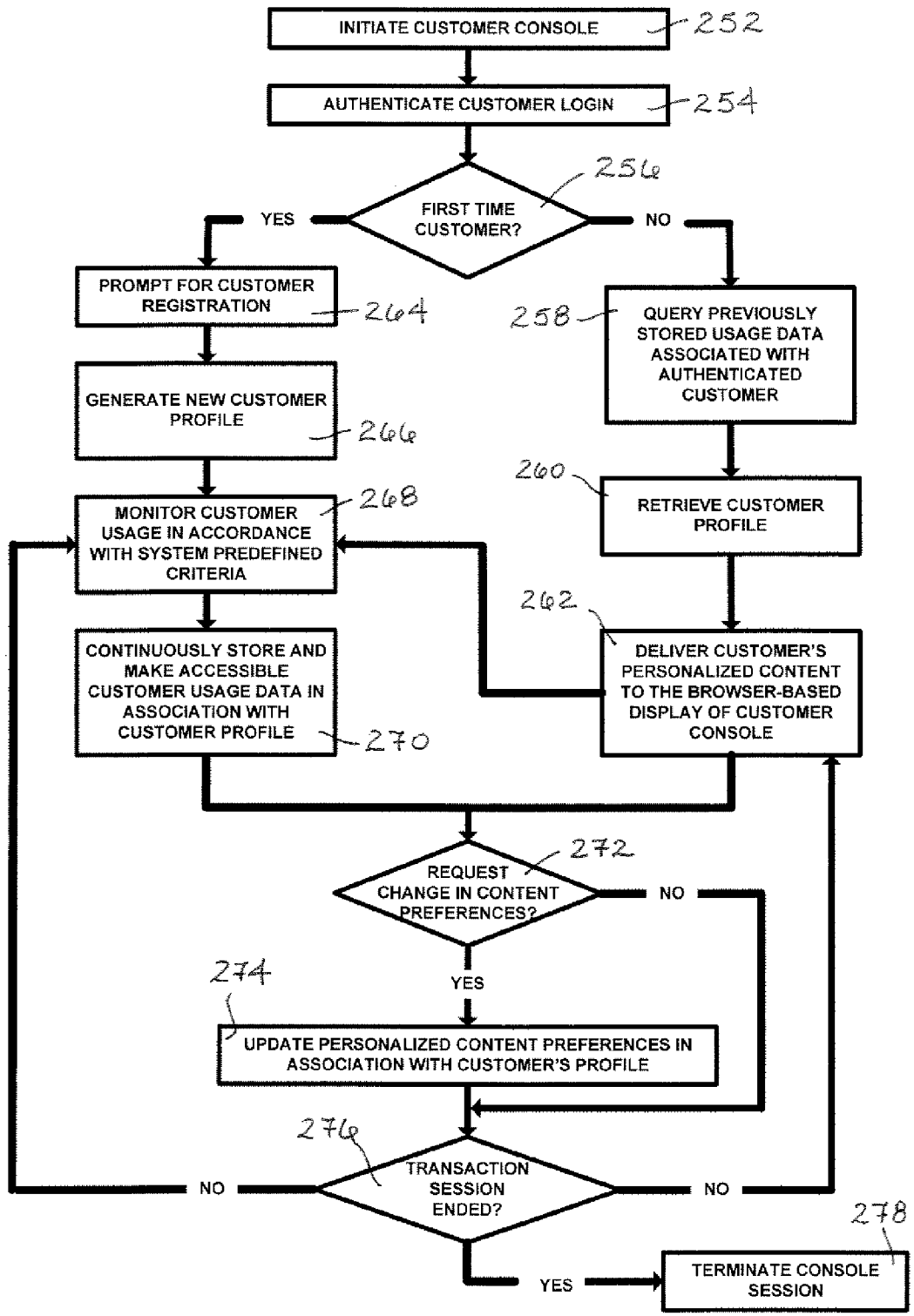

FIGS. 2A-2B are illustrative depictions of the general steps that may be employed by system 100 in creating a personalized customer experience at an accessible e-banking touch points 106, wherein the customer interacts with a touch point's user interface to carry out a transaction with their financial institution.

Referring to FIG. 2A, system 100 may be configured to monitor and record a customer's interactions with any one of the touch points 106 accessible at a financial institution 104 and coupled via a network to multi-channel server 102. A customer interaction session is initiated, at step 202, when the customer successfully logs into any accessible e-banking touch point 106. For example, a customer may swipe a banking card or enter a pin authorizing him/her to access their account via the touch point. Upon authentication of the customer, a system check may be performed, at step 204, to determine whether this particular customer has accessed, on a prior occasion, any other touch point networked to multi-channel server 102. If system 100 determines that this is a returning customer, then a query may be made to multi-channel server 102 for stored usage data, as well as preferences predefined by the customer via a personal touch point (described in more detail in conjunction with FIG. 2B), associated with the authenticated customer. However, if it is determined, at step 204, that the authenticated customer is a first-time customer accessing a touch point coupled to multi-channel server 102, then system 100 may be configured to generate a new customer profile, at step 212, prior to proceeding onto subsequent steps.

Customer usage data and personalized preferences may be stored by system 100 and associated with a system created customer profile. Customer usage data may be stored, for example, at any one of databases 112 interconnected with multi-channel server 102. Upon receipt of a query, at step 206, the customer's profile is retrieved, at step 208, and personalized content is delivered, at step 210, to the output (e.g., a video display) of the touch point. Thereafter, system 100 may be further configured to continuously monitor, at step 214, the customer's present session actions at the touch point in accordance with system predefined criteria. System predefined criteria may be any applicable transaction criteria that may later be retrieved during subsequent customer visits to any touch point networked to that financial institution's multi-channel server 102 in order to provide the customer with a more personalized and accelerated transaction experience at the touch point. For example, withdrawal amounts typically requested by a customer may be a system predefined criteria that is monitored, at step 214, and stored, at step 216. Thereafter, if the same customer accesses the same touch point, or any another touch point located at a different branch that is also coupled to multi-channel server 102, this information may be retrieved and presented to the customer at the touch point. Let's say, for instance, the customer frequently withdraws $60 from his checking account. The system may store this information in association with the customer's profile and make it available for immediate access by all touch points networked to the multi-channel server 102. Thus, when the customer accesses any one these networked touch points at a later point in time, system 100 may prompt the customer whether he/she wishes to withdraw their typical withdrawal amount of $60. System 100 may be configured to continuously monitor for system predefined criteria, at step 214, and store the monitored information, at step 216, until a transaction session is determined, at step 218, to have ended. When the transaction is complete, system 100 may then terminate the touch point session, at step 220.

In another embodiment, a personalized experience may be provided at any of the touch points 106 in accordance with customer selected options made, for example, via web-enabled devices 116 that provide access to a financial institution's Internet based touch point (e.g., online banking website). FIG. 2B illustrates the steps that may be employed in creating a user-defined personalized touch point experience. The personalization process is initiated, at step 252, when a customer accesses the financial institution's web-based console via a device 116 and is authenticated by system 100, at step 254. Similar to the system monitoring procedures described in conjunction with FIG. 2A, a system check is made, at step 256, to determine whether this is the first time the customer is accessing the web-based console. If so, the customer is prompted, at step 264, to register to use the console and a new customer profile is generated, at step 266. However, if the customer has previously accessed the web-based console, then the system may query, at step 258, for previously stored usage data associated with the authenticated customer. The customer profile is retrieved, at step 260, and content associated with that profile is delivered to the customer via the browser-based display of the customer console, at step 262. Actions executed by the customer during the console session may be monitored, at step 268, in accordance with system predefined criteria and continuously stored and made accessible, at step 270, to all of the financial institution's other touch points 106 networked to their multi-channel server 102.

System 100 is further configured to record any customer requests for changes in content preferences made during the aforementioned web-based session. Requests for changes in personal content provides a customer with an opportunity to personalize their banking experience at, for example, ATM touch point 106b. A customer may customize the environment displayed to them when conducting a transaction at ATM touch point 106b by selecting various modifiable customer preferences via the web-based console, such as, display of customer name, favorite withdrawal account and amount, preferred language or any other applicable customer preference. At step 272, system 100 checks for such customer specified requests and updates, at step 274, any previously stored personalized content associated with that customer's profile. After customer preferences are updated, or if no requests for a change in content preferences are submitted by the customer via the console, system 100 may then determine, at step 276, if the customer has completed his/her transactions and, if in the affirmative, properly terminate the console session, at step 278.

Figure 3:
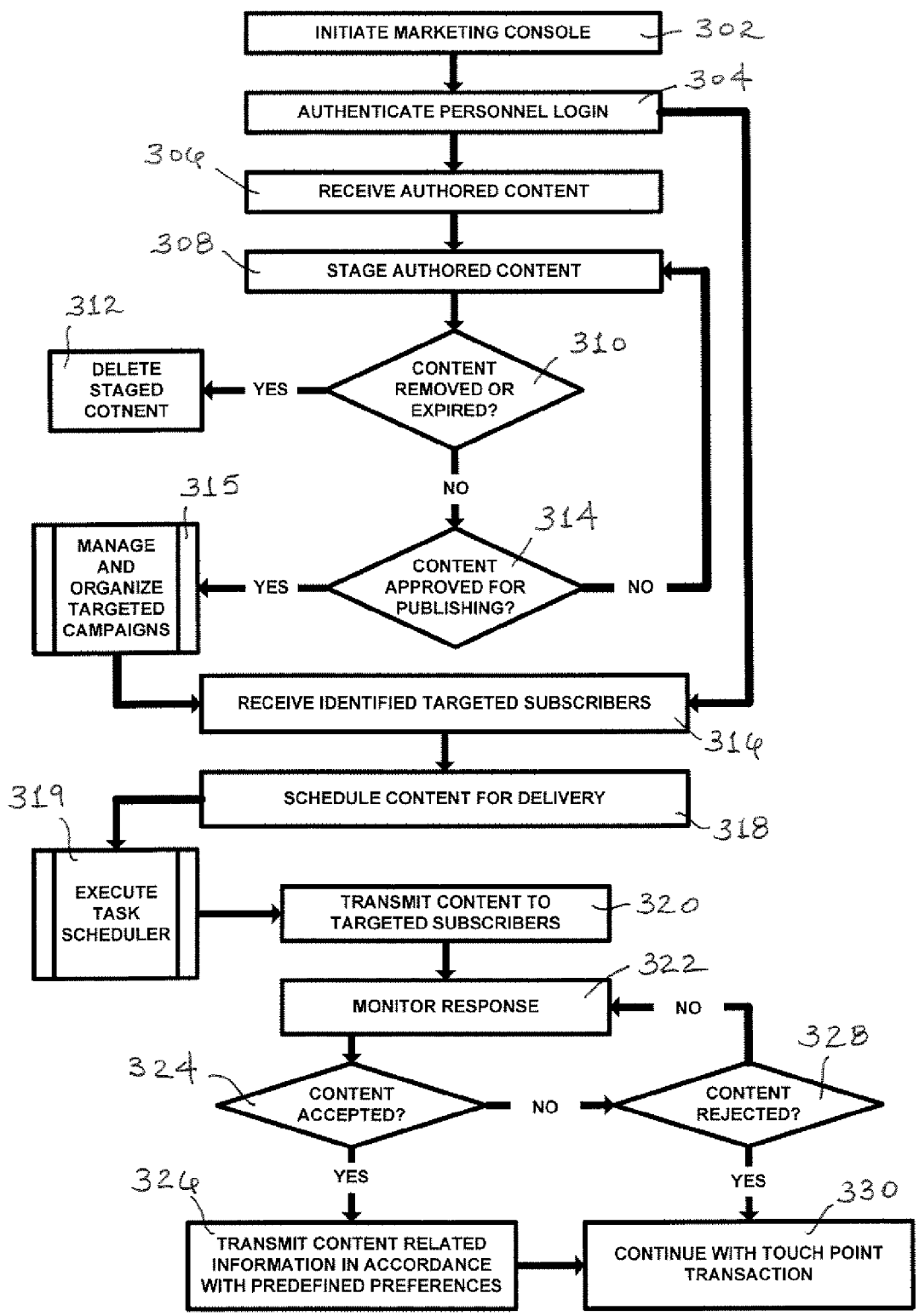
FIG. 3 is a flowchart illustrating the steps employed in publishing and monitoring marketing content on touch points in accordance with an exemplary embodiment of the present invention.

In addition to the personalization of customer environments presentable at touch points 106 that are commonly networked to multi-channel server 102, authorized personnel in association with a financial institution may also employ system 100 of the present invention to publish particular content to, as well as to monitor and control technical aspects of, their commonly networked touch points 106. Referring to FIG. 3, system 100 may be configured to provide access to a marketing console for permitting authorized marketing personnel associated with a financial institution to manage and monitor marketing campaigns in real time. A marketing console session is initiated (e.g., on marketing computer system 108), at step 302, and an accessing member of the marketing staff is authenticated by system 100, at step 304. Thereafter, marketing content that is received, at step 306, by system 100 of the present invention may be managed accordingly.

Marketing content that is received by system 100 may include advertisements, promotions, ticker-style messages, comparisons of services offered by competing financial institutions or any other suitable source of authored content. Marketing content may be received from a plurality of sources and routed via the network to multi-channel server 102 of system 100 in order to ultimately be made available for remote publishing on any networked combination of touch points 106. For example, marketing content may be contributed by outside vendors or local community supporters of the financial institution, authored by a member of the marketing staff or generated automatically by system 100 in response to the satisfaction of certain criteria. Content received at multi-channel server 102 may then be staged, at step 308, until it is approved for publishing on networked touch points by the authorized marketing staff member. System 100 may be further configured to continuously check, at step 310, if staged content has expired or been marked for deletion by the authorized marketing staff member. If so, marketing content is deleted at step 312.

However, if marketing content is determined to be current, system 100 may progress to step 314, to make a determination as to whether current marketing content has been approved for publishing by an authorized member of the marketing staff. Marketing content approved for publishing may then be forwarded, at step 315, to an independent process for managing and organizing targeted campaigns, which are ultimately received and made available with identifiable targeted subscribers, at step 316, for authorized personnel to push out to any select combination of touch points 106 located at any financial branch location 104 that is coupled to their multi-channel server 102.

From this point, authorized marketing staff members may select an available marketing campaign associated with targeted subscribers and schedule it, at step 318, for delivery to various touch points and/or, alternatively, to specific customers accessing touch points 106 during a predefined period of time. Marketing content selected for distribution to touch points 106 may employ the use an additional independent set of procedures, at step 319, responsible for scheduling marketing tasks to be executed in conjunction with select networked touch points 106. Once marketing content has been selected for delivery and appropriately scheduled for distribution, the content may be transmitted, at step 320, to the selected subscribers and/or designated recipients of the content.

Marketing content published on touch points 106 may be monitored in real-time by any authorized member of the marketing staff. For example, a customer accessing SSCC touch point 106a may be presented with a bank promotion on an interactive touch screen display of touch point 106a, informing the customer that his/her current coin counting transaction in progress may be eligible for direct deposit into his/her existing savings/checking accounts and, additionally, may ask if he/she would like to receive additional information regarding this process. Members of the marketing staff may monitor, at step 322, in real-time the customer's response while his transaction is being processed. If the customer indicates, at step 324, an affirmative interest in the direct deposit promotion provided on the display of touch point 106, then the member of the marketing staff may receive this information in real-time on his/her marketing console and immediately instruct marketing system 108, at step 326, to transmit the direct deposit related information to the customer in accordance with his/her predefined notification preferences (e.g., that may have been provided as a personalization option, as described earlier in the description in connection with FIG. 2B). Similarly, if the customer decides to reject receiving additional information regarding the promotion, determined at step 328, the member of the marketing staff may monitor this response and update internal records on marketing system 108 in order to better tailor and target what marketing content a customer may or may not have interest in. Independent of whether or not a customer responds to the published content, system 100 may be configured to continue, at step 330, with the touch point transaction, thereby keeping operations of networked touch points robust and desirable to use.

Figure 4:
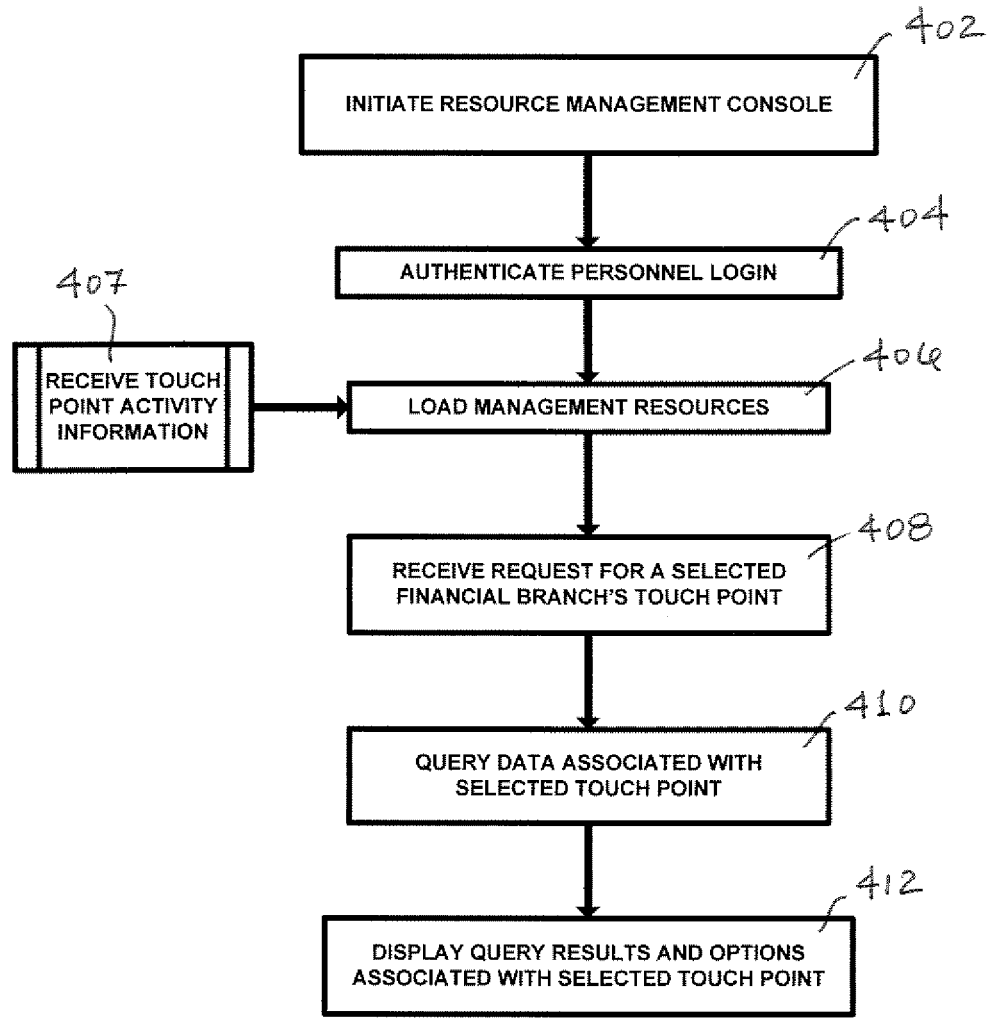
FIG. 4 is a flowchart illustrating the steps employed in managing and monitoring touch point deployment in accordance with an exemplary embodiment of the present invention.
Figure 5:
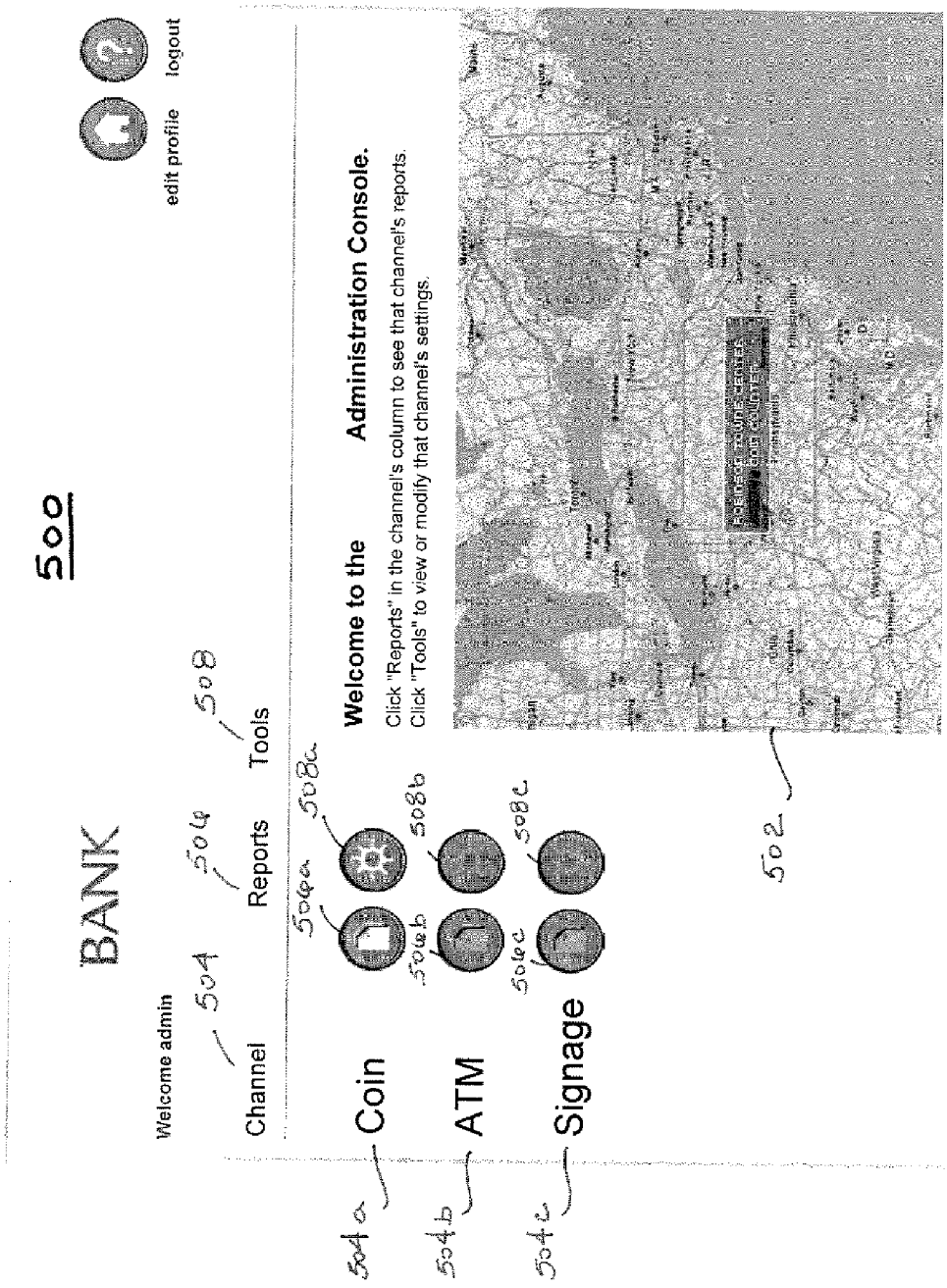
FIG. 5 is an illustrative depiction of a main display screen that may be provided for a resource management console in accordance with an exemplary embodiment of the present invention.

Management and IT personnel may also be provided with access to data routed through multi-channel server 102, as well as the corresponding networked touch points 106, via a resource management console accessible through operations computer system 110 situated, for example, at the IT center branch of a financial institution. In FIG. 4, an illustrative depiction of the steps that may be employed by computer system 110 coupled through the network to multi-channel server 102 of system 100 is provided.

A resource management console session is initiated, at step 402, and an accessing member of the management or IT staff is authenticated by system 100, at step 404. Thereafter, management resources are loaded on the resource management console, at step 406, which may be supported and populated by an independent process 407 responsible for continuously monitoring and updating the status of touch points 106 interconnected via the network to multi-channel server 102 of system 100. An exemplary main display 500 of the resource management console is illustrated in FIG. 5A, which provides an authorized staff member with an interactive branch map 502, for identify financial branches of interest networked to multi-channel server 102. A financial branch displayed on map 502 may be selected by the authorized staff member in order to generate statistical reports regarding touch points 106 located at the selected branch or, alternatively, to manage touch points 106 at the selected branch. Touch points available at a branch are listed in channel display section 504. For example, a selected branch location may have a SSCC touch point 106a, an ATM touch point 106b and a plasma signage display touch point 106c identified, respectively, by touch point identifiers 504a, 504b and 504c provided on main display 500. A corresponding reports display section 506 and tools display section 508 may also be provided on the main display 500, in order to provide authorized staff members with an ability to generate statistical reports, utilizing report generation options 506a-506b, or to manage, utilizing tools options 508a-508c, touch points 106 listed on main display 500.

When a request is received, at step 408, via main display 500 for a selected touch point 106, system 100 may be configured to query, at step 410, the requested data associated with the selected touch point and display, at step 412, the query results along with additional monitoring-related display options. For example, an authorized staff member may select to generate a transaction report for SSCC 106a by selecting option 506a corresponding to SSCC touch point identifier 504a, wherein the report generated is retrieved from data stored in, for example, database 112b coupled to multi-channel server 102 networked to computer system 110.

The foregoing is merely illustrative of the principles of the present invention and various modifications can be made by those skilled in the art without departing from the scope and spirit of the invention. One skilled in the art will appreciate that the present invention can be practiced by other than the described embodiments, which are presented for purposes of illustration and not by way of limitation, and the present invention is limited only by the claims that follow.

What is claimed is:

1. A method for constructing a unified electronic banking environment, said method comprising the steps of:
providing at least one common multi-channel server coupled to more than one e-banking touch points and also coupled to at least one computer system configured with at least one control console, said more than one e-banking touch points and said at least one computer system being provided in locations remote from the other, and further wherein said more than one plurality of e-banking touch points are comprised of at least two different types of e-banking touch point devices, each of which comprise one or more of an automatic teller/transaction machine (ATM), a self service coin counter (SSCC), a kiosk, a digital signage display, an online accessible banking website, a personal digital assistant (PDA), a personal computer (PC), a laptop, a wireless device, or a combination of two or more thereof, and wherein at least one of said e-banking touch points is in communication with one or more financial institutions through said multi-channel server;
receiving an actionable input from at least one e-banking touch point;
retrieving previously stored data associated with said actionable input, wherein said previously stored data is accessible to any one of said e-banking touch points, and said previously stored data comprises data from one or more financial institutions and one or more user-defined preferences;

delivering said retrieved data to said at least one e-banking touch point transmitting said actionable input;

storing transactional usage data associated with said at least one e-banking touch point transmitting said actionable input, wherein said stored transactional usage data is accessible by any one of said more than one e-banking touch points and said at least one computer system;

monitoring via said server an active session in real-time for selection of targeted marketing content correlated to said user-defined preferences;

subsequent to said monitoring, selecting in real-time said targeted marketing content correlated to said user-defined preferences; and transmitting in real-time said targeted marketing content during said active session to at least one of said e-banking touch points for acceptance, rejection, or no response by a user, wherein said response by said user is used during said active session to determine whether transmission of additional information related to said marketing content occurs during said active session.

2. The method of claim 1, wherein said stored transactional usage data is stored in association with a customer profile.

3. The method of claim 1, wherein said user-defined preferences comprise one or more of a customer name, a language to be used in connection with one or more of said touch points, an account for conducting transactions, and a monetary amount to be the subject of select transactions.

4. The method of claim 1, further comprising the step of determining whether said marketing content is classified as being one or more of current or approved content.

5. The method of claim 1, wherein said method permits distribution of one or more of advertisements, messages, offers and promotions.

6. The method of claim 1, further comprising the step of transmitting additional information related to said marketing content during said active session.

7. A method for constructing a unified electronic banking environment, said method comprising the steps of:

providing a common multi-channel server coupled to one or more e-banking touch points and also coupled to one or more computer systems, wherein each computer system is associated with a financial institution, said e-banking touch points being provided in locations remote from the other, and each of which comprise one or more of an automatic teller/transaction machine (ATM), a self-service coin counter (SSCC), a kiosk, a digital signage display, an online accessible banking website, a personal digital assistant (PDA), a personal computer (PC), a laptop, a wireless device, or a combination of two or more thereof, and wherein at least one of said e-banking touch points is in communication with one or more financial institutions through said multi-channel server;

receiving an actionable input from at least one e-banking touch point;

retrieving previously stored data associated with said actionable input, wherein said previously stored data is accessible to any one of said e-banking touch points, and said previously stored data comprises data from one or more financial institutions and one or more user-defined preferences;

delivering said retrieved data to said at least one e-banking touch point transmitting said actionable input;

storing transactional usage data associated with said at least one e-banking touch point transmitting said actionable input, wherein said stored transactional usage data is accessible by any one of said e-banking touch points and said one or more computer systems;

monitoring via said server said active session in real-time for selection of targeted marketing content correlated to said user-defined preferences;

subsequent to said monitoring, selecting in real-time said targeted marketing content correlated to said user-defined preferences; and transmitting in real-time said targeted marketing content during said active session to at least one of said e-banking touch points for acceptance, rejection, or no response by a user, wherein said response by said user is used during said active session to determine whether transmission of additional information related to said marketing content occurs during said active session.

8. The method of claim 7, wherein said stored transactional usage data is stored in association with a customer profile.

9. The method of claim 7, wherein said user-defined preferences comprise one or more of a customer name, a language to be used in connection with one or more of said touch points, an account for conducting transactions, and a monetary amount to be the subject of select transactions.

10. The method of claim 7, further comprising the step of determining whether said marketing content is classified as being one or more of current or approved content.

11. The method of claim 7, wherein said method permits distribution of one or more of advertisements, messages, offers and promotions.

12. The method of claim 7, further comprising the step of transmitting additional information related to said marketing content during said active session.

13. A unified electronic banking system, said system comprising:

a common multi-channel server, wherein said multi-channel server is communicatively coupled to one or more independent computer systems;

wherein each of one or more independent computer systems is associated with an independent financial institution, and each of said computer systems is communicatively coupled to said multi-channel server;

one or more e-banking touch points, each of which comprise one or more of an automatic teller/transaction machine (ATM), a self-service coin counter (SSCC), a kiosk, a digital signage display, an online accessible banking website, a personal digital assistant (PDA), a personal computer (PC), a laptop, a wireless device, or a combination of two or more thereof, wherein one or more of said e-banking touch points are communicatively coupled to said multi-channel server, and wherein at least one of said e-banking touch points is in communication with one or more financial institutions through said multi-channel server; and a data storage device, wherein transactional usage data associated with a transaction initiated by a user through one of said e-banking touch points is stored in said data storage device and accessed by one or more of said other e-banking touch points;

wherein said active session is monitored via said server in real-time for selection of targeted marketing content correlated to said user-defined preferences, said targeted marketing content correlated to said user-defined preferences is selected subsequent to said monitoring and transmitted in real-time to at least one of said e-banking touch points for acceptance, rejection, or no response by a user, and wherein said response by said user is used during said active session to determine whether transmission of additional information related to said marketing content occurs during said active session.

14. The system of claim 13, wherein said stored transactional usage data is stored in association with a customer profile.

15. The system of claim 13, wherein said user-defined preferences comprise one or more of a customer name, a language to be used in connection with one or more of said touch points, an account for conducting transactions, and a monetary amount to be the subject of select transactions.

16. The system of claim 13, wherein said transactional usage data may be used to analyze specific customer habits.

17. The system of claim 13, wherein said system provides said one or more financial institutions with a common point of control of functionality provided by said system.

18. The system of claim 13, wherein said marketing content is classified as being one or more of current or approved content.

19. The system of claim 13, wherein said system permits distribution of one or more of advertisements, messages, offers and promotions.

20. The system of claim 13, wherein said additional information related to said marketing content is transmitted during said active session.

* * * * *